US00RE50095E

(19) United States
(12) Reissued Patent
Brill et al.

(10) Patent Number: US RE50,095 E
(45) Date of Reissued Patent: Aug. 27, 2024

(54) SEMI-ROUND FLOOR DRAIN

(71) Applicant: INFINITY DRAIN LTD., Amityville, NY (US)

(72) Inventors: Jonathan Brill, Amityville, NY (US); Bhash Ramkarran, Amityville, NY (US); Alan Trink, Amityville, NY (US)

(73) Assignee: INFINITY DRAIN LTD., Amityville, NY (US)

(21) Appl. No.: 29/883,945

(22) Filed: Feb. 6, 2023

Related U.S. Patent Documents

Reissue of:
(64) Patent No.: Des. 890,307
Issued: Jul. 14, 2020
Appl. No.: 29/637,886
Filed: Feb. 22, 2018

U.S. Applications:
(62) Division of application No. 29/831,857, filed on Mar. 23, 2022, which is an application for the reissue of Pat. No. Des. 890,307.

(51) LOC (14) Cl. ..... 23-01
(52) U.S. Cl.
USPC ..... D23/259
(58) Field of Classification Search
USPC ..... D23/259, 260, 262, 265, 269, 303, 304; D8/349, 354

(Continued)

(56) References Cited

U.S. PATENT DOCUMENTS 2,803,348 A * 8/1957 Bingham ..... E03F 5/06 210/498
4,146,939 A * 4/1979 Izzi ..... E03F 5/0409 4/286

(Continued)

OTHER PUBLICATIONS

Infinity Drain CDI 22 2" Clamp Down Drain, Cast Iron,https://www.amazon.com/Infinity-Drain-Clamp-Down-Cast/dp/B008H85W1Y/ref=pd_day0_h1_60_5/143-5672237-2678107?encoding=UTF8&pd_rd_i=B008H85W1Y&pd_rd_r=b54ec78e-7d52-11e9-aef3-91e0c1ba0bc6&pd_rd_w=17K (Year: 2012).*

(Continued)

*Primary Examiner* — Philip S Hyder
(74) *Attorney, Agent, or Firm* — F. Chau & Associates, LLC

(57) CLAIM

The ornamental design for a semi-round floor drain, as shown and described.

DESCRIPTION

[FIG. 1 is a perspective view of a semi-round floor drain in accordance with the present invention;]
[FIG. 2 is a top plan view thereof;]
[FIG. 3 is a left elevational view thereof;]
[FIG. 4 is a bottom elevational view thereof;]
[FIG. 5 is a right elevational view thereof;]
[FIG. 6 is a front elevational view thereof;]
[FIG. 7 is a rear elevational view thereof.]
*FIG. 8 is a perspective view of a semi-round floor drain in accordance with the present invention;*
*FIG. 9 is a top plan view thereof:*
*FIG. 10 is a left elevational view thereof;*
*FIG. 11 is a bottom elevational view thereof;*
*FIG. 12 is a right elevational view thereof;*
*FIG. 13 is a front elevational view thereof; and,*
*FIG. 14 is a rear elevational view thereof.*
The broken lines shown in the drawings illustrate portions of the semi-round floor drain and screws used with the semi-round floor drain that form no part of the claimed design.

1 Claim, 8 Drawing Sheets

Matter enclosed in heavy brackets [ ] appears in the original patent but forms no part of this reissue; matter printed in italics indicates the additions made by reissue.

(58) Field of Classification Search

CPC ..... E03C 1/22; A47K 3/405; E03F 5/0408; E03F 2005/0415; E03F 5/04; E03F 5/041; E03F 2005/0413

See application file for complete search history.

(56) References Cited

U.S. PATENT DOCUMENTS

| | | | | | |
|---|---|---|---|---|---|
| 4,233,697 | A * | 11/1980 | Cornwall | E03D 11/16 | 4/293 |
| 4,462,123 | A * | 7/1984 | Morris | E03F 5/0407 | 4/286 |
| 4,827,539 | A * | 5/1989 | Kiziah | E03D 11/16 | 285/58 |
| 4,984,308 | A * | 1/1991 | Handal | F16L 5/08 | 4/252.6 |
| 5,018,224 | A * | 5/1991 | Hodges | E03D 11/16 | 4/DIG. 9 |
| 5,115,554 | A * | 5/1992 | Fell, Sr. | E03D 11/16 | 285/58 |
| D334,051 | S * | 3/1993 | Fell, Sr. | D23/262 | |
| 6,065,160 | A * | 5/2000 | Winn | E03D 11/16 | 4/252.5 |
| D426,874 | S * | 6/2000 | Warshawsky | D23/241 | |
| D447,224 | S * | 8/2001 | Barnum | D23/308 | |
| 6,408,918 | B1 * | 6/2002 | Hummell | B32B 38/1841 | 156/391 |
| 6,442,769 | B1 * | 9/2002 | Phillips | F16L 23/12 | 4/252.4 |
| D506,668 | S * | 6/2005 | Black | D8/354 | |
| D509,887 | S * | 9/2005 | Sutopo | D23/293.1 | |
| D542,396 | S * | 5/2007 | Bates | D23/313 | |
| 7,309,443 | B2 * | 12/2007 | Kelty | C02F 1/325 | 210/167.1 |
| D574,931 | S * | 8/2008 | Hughes | D23/262 | |
| D579,092 | S * | 10/2008 | Cummings | D23/313 | |
| 7,624,759 | B1 * | 12/2009 | Ismert | E03C 1/22 | 4/293 |
| D633,605 | S * | 3/2011 | Tanus | D23/308 | |
| D641,459 | S * | 7/2011 | Corpuz, Jr. | D23/313 | |
| D647,181 | S * | 10/2011 | Kovach | D23/259 | |
| D649,627 | S * | 11/2011 | Corpuz, Jr. | D23/313 | |
| 8,336,127 | B1 * | 12/2012 | Butcher | E03D 11/16 | 4/252.1 |
| D693,856 | S * | 11/2013 | Thompson | D15/28 | |
| D699,821 | S * | 2/2014 | Beaudoin | D23/267 | |
| D715,901 | S * | 10/2014 | Antoniello | D23/259 | |
| D722,366 | S * | 2/2015 | Beaudoin | D23/261 | |
| D722,679 | S * | 2/2015 | Beaudoin | D23/261 | |
| D725,238 | S * | 3/2015 | Beaudoin | D23/261 | |
| D729,354 | S * | 5/2015 | Kieper | D23/262 | |
| D729,355 | S * | 5/2015 | Kieper | D23/262 | |
| 9,068,678 | B2 * | 6/2015 | Whitehead | F16L 23/024 | |
| D739,507 | S * | 9/2015 | Watson | D23/262 | |
| 9,157,213 | B2 * | 10/2015 | Beaudoin | E05C 3/12 | |
| 9,187,887 | B2 * | 11/2015 | Coronado | F16L 47/32 | |
| D751,676 | S * | 3/2016 | Frick | F16L 37/0841 | D23/262 |
| D787,646 | S * | 5/2017 | Davis | D23/259 | |
| D791,395 | S * | 7/2017 | Rashidi Doust | D26/113 | |
| D814,267 | S * | 4/2018 | Verbowski | D8/354 | |
| 10,240,331 | B1 * | 3/2019 | Condon | E03D 11/16 | |
| D883,449 | S * | 5/2020 | Newcomb | D23/259 | |
| D900,980 | S * | 11/2020 | Newcomb | D23/259 | |
| D927,655 | S * | 8/2021 | Coronado | D23/269 | |
| 11,186,977 | B2 * | 11/2021 | Lorkowski | E03D 11/16 | |
| D948,587 | S * | 4/2022 | Dvorak | F04B 1/122 | D15/143 |
| 2003/0093855 | A1 * | 5/2003 | Rendell | E03D 11/17 | 4/252.4 |
| 2003/0115814 | A1 * | 6/2003 | Nielsen | E03F 5/0406 | 52/302.1 |
| 2009/0145828 | A1 * | 6/2009 | Andrei | F04D 29/708 | 210/167.1 |
| 2010/0037376 | A1 * | 2/2010 | Hughes | E03D 11/16 | 4/252.5 |
| 2013/0067648 | A1 * | 3/2013 | Whitehead | E03D 11/16 | 29/428 |
| 2014/0255098 | A1 * | 9/2014 | Beaudoin | E05C 3/12 | 405/36 |
| 2015/0240468 | A1 * | 8/2015 | Zhou | E03D 11/16 | 4/252.1 |
| 2018/0073237 | A1 * | 3/2018 | Say | E03F 5/0411 | |
| 2019/0106874 | A1 * | 4/2019 | Brill | E03F 5/0408 | |

OTHER PUBLICATIONS

Infinity Drain CDS 22 2" Clamp Down Drain,ABS, https://www.amazon.com/Infinity-Drain-CDA-C1amp-Down/dp/B00LC196J0/ref=sr_1_99_sspacrid=36JJRZ9Y6R71X&keywords=infinity+drain&qid=1558612699&s=gateway&sprefix=infinity+drain%2Caps%2C141&sr=8-99-spons&psc=1 (Year: 2017).*

Infinity Drain 2in. No Hub Platic Floor Drain ICDP22; Ferguson Website; Copyright 2019; Visited Online Oct. 10, 2019; https://www.ferguson.com/product/infinity-drain-2-in-no-hub-plastic-floor-drain-icdp22/_/R-4642315 (Year: 2019).*

330-NL Assemblies; Lakeside Supply Company PDF p. 1; Posted online 3 years ago; 2016; Visited Online Oct. 10, 2019; https://docplayer.net/23075283-Wade-specification-drainage-products.html (Year: 2016).*

330-NL Assemblies; Lakeside Supply Company PDF p. 1; WayBack Internet Archive Date Aug. 16, 2017, Posted Online 11 months earlier Jul. 2016; Visited Online Oct. 10, 2019; https://web.archive.org/web/20170816200644/https://docplayer.net/23075283-Wade-specification-drainage-products.html (Year: 2016).*

Infinity Drain Throat ABS Clamp Down Drain Model CDA 22; Build.com website copyright date 2000-2019; Visited Online Oct. 10, 2019; https://www.build.com/infinity-drain-cda-22/s1364853#overview.*

Clamp Down Floor Drain CDI 22; Infinity Drain Website; Visited online Oct. 10, 2019; Wayback Internet Archive Date Dec. 19, 2016; https://web.archive.org/web/20161219181902/http://infinitydrain.com/components-and-parts?component_type=parts (Year: 2016).*

* cited by examiner

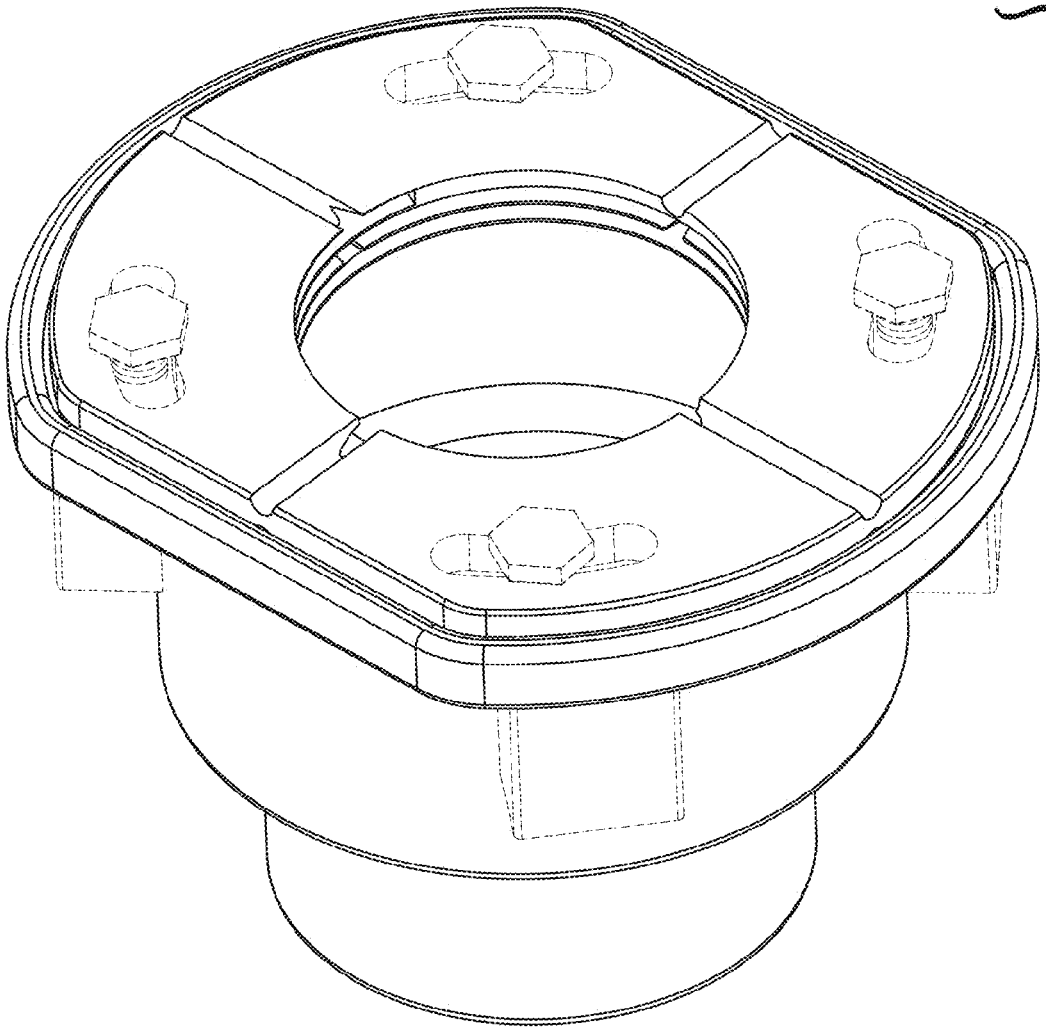
FIG. 1 (CANCELED)

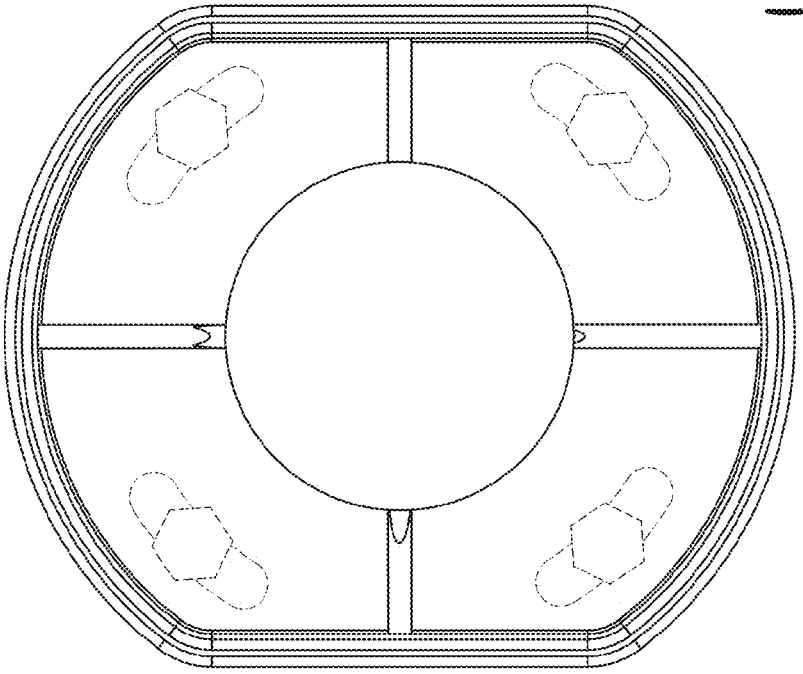
FIG. 2 (CANCELED)
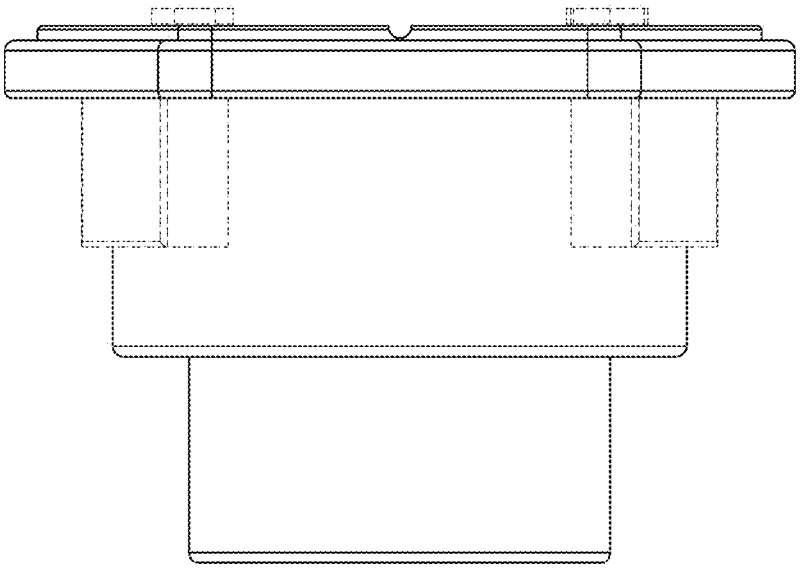
FIG. 3 (CANCELED)

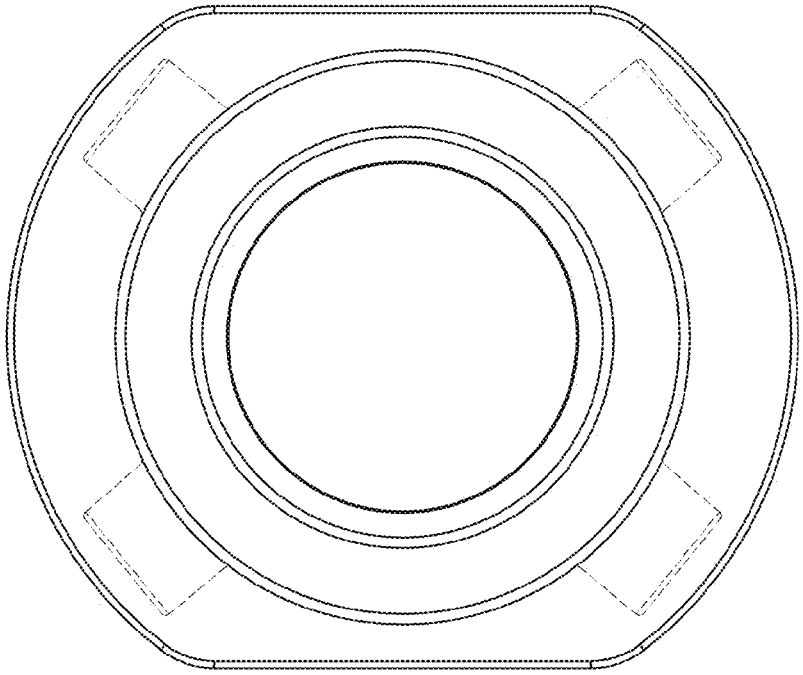
FIG. 4 (CANCELED)
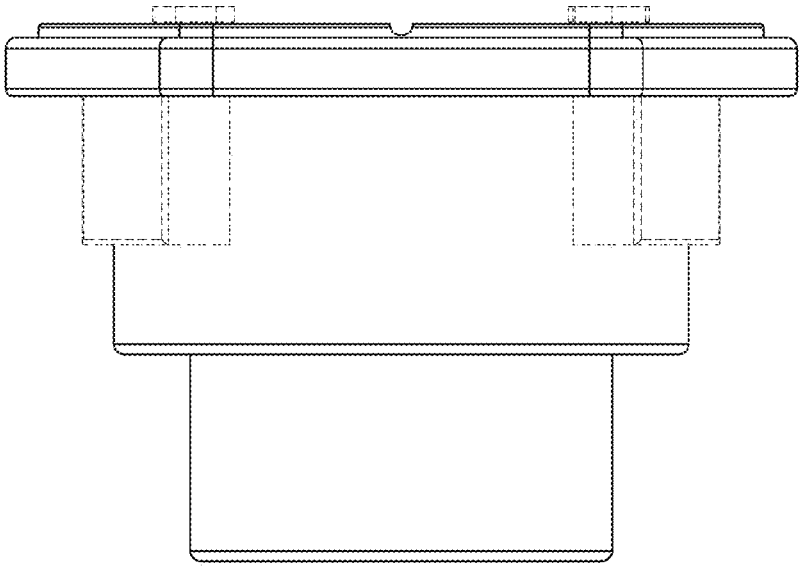
FIG. 5 (CANCELED)

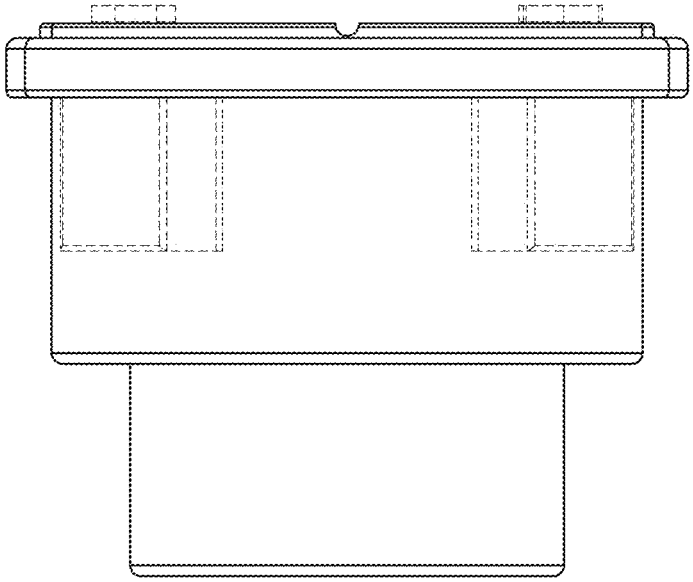
FIG. 6 (CANCELED)
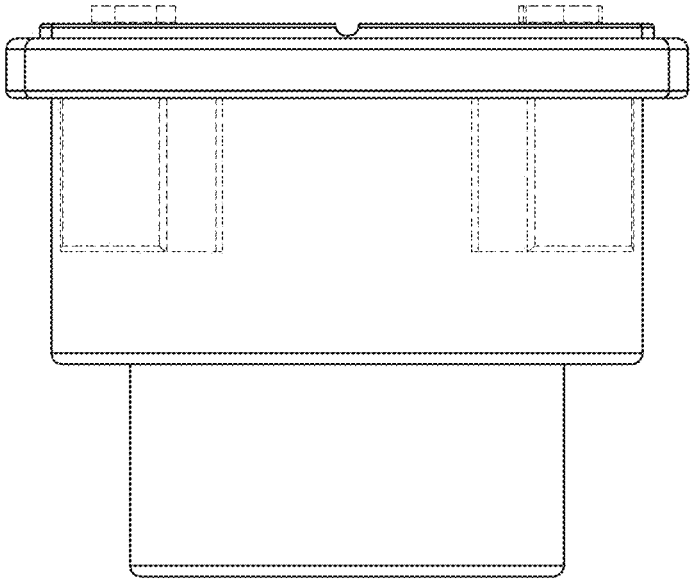
FIG. 7 (CANCELED)

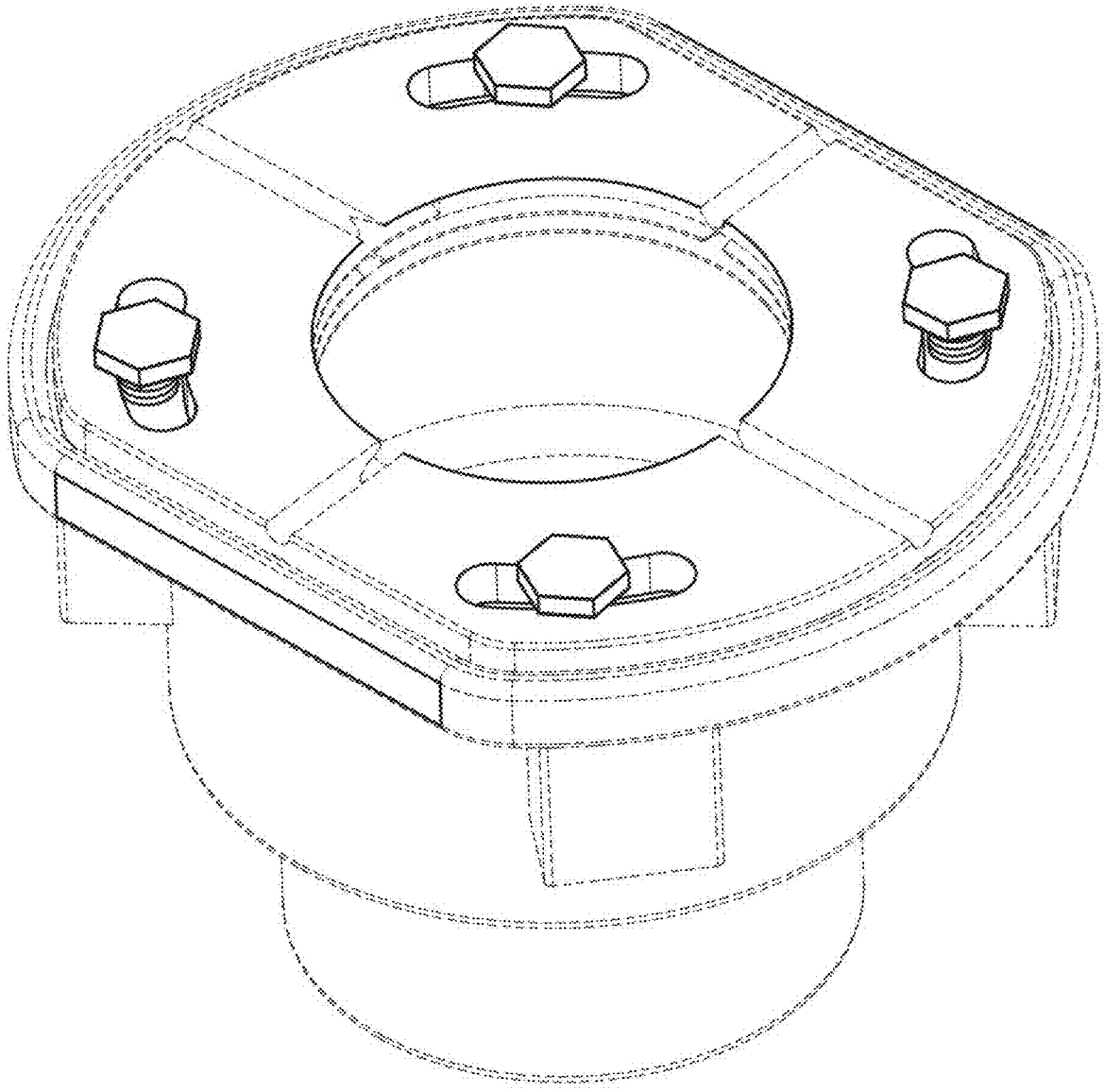
FIG. 8 (New)

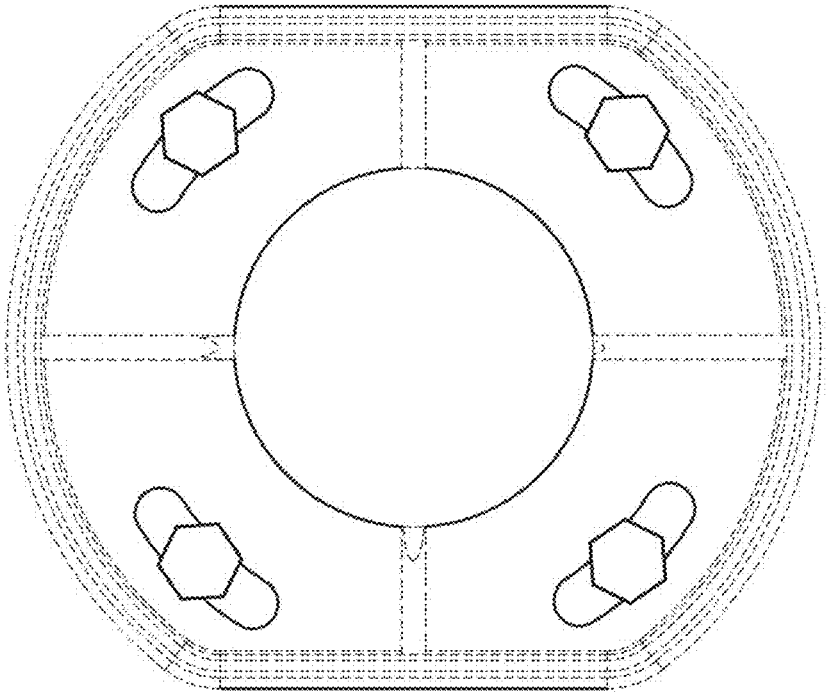
FIG. 9 (New)
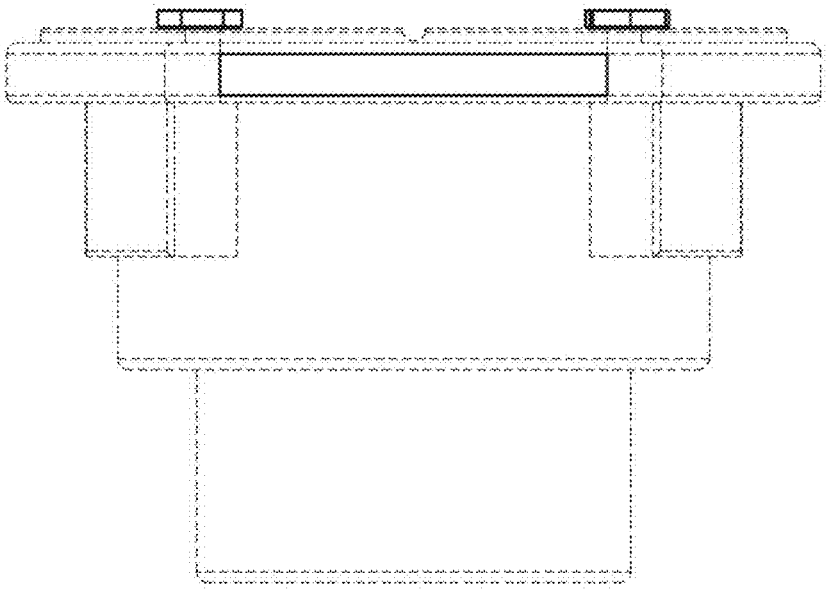
FIG. 10 (New)

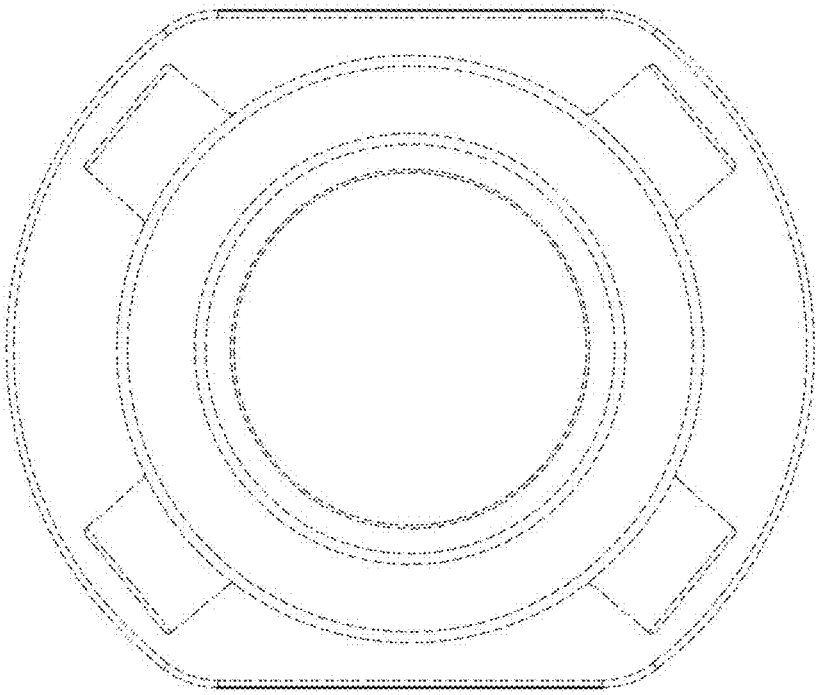
FIG. 11 (New)
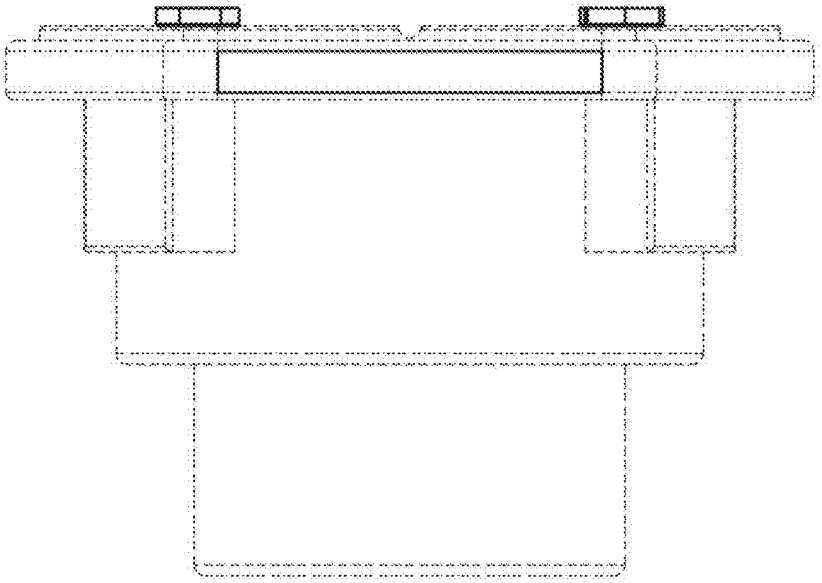
FIG. 12 (New)

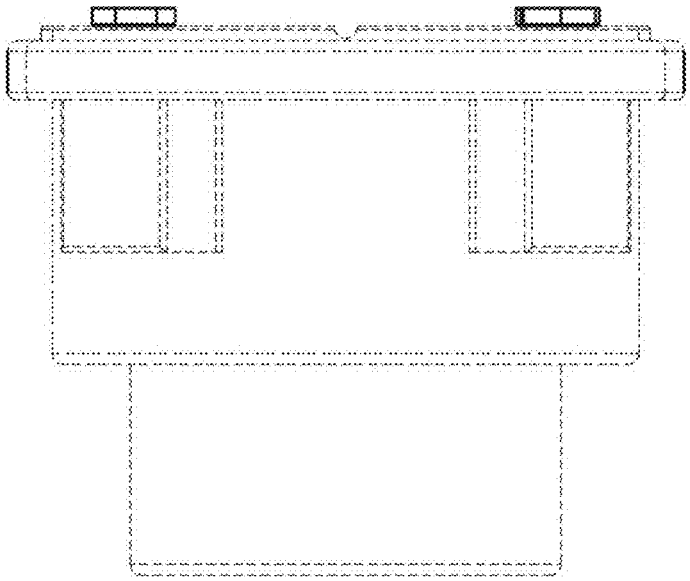
FIG. 13 (New)
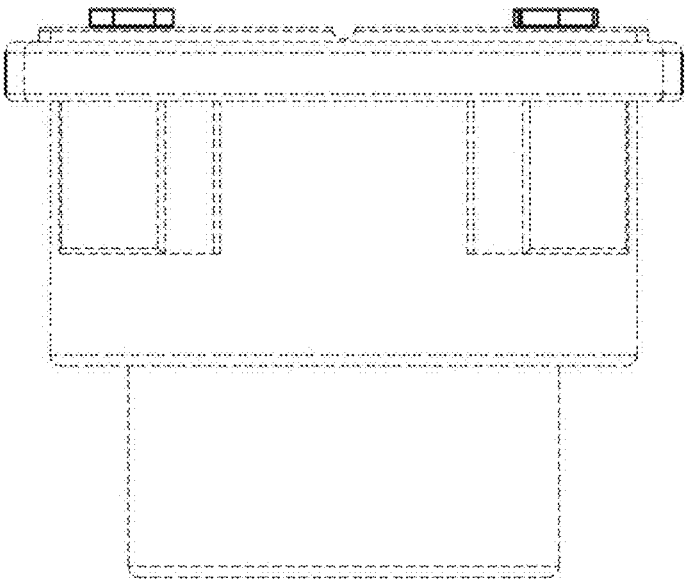
FIG. 14 (New)